United States Patent

[11] 3,570,566

| | | |
|---|---|---|
| [72] | Inventor | James F. McCreery<br>Latrobe, Pa. |
| [21] | Appl. No. | 791,606 |
| [22] | Filed | Jan. 16, 1969 |
| [45] | Patented | Mar. 16, 1971 |
| [73] | Assignee | Kennametal Inc.<br>Latrobe, Pa. |

[54] ROTARY CUTTING DEVICE
9 Claims, 9 Drawing Figs.

[52] U.S. Cl. ........................................... 144/2,
144/176, 144/235
[51] Int. Cl. ....................................... B27c 1/00,
B27c 9/00
[50] Field of Search ......................................... 144/176,
2—11, 234, 235, 218, 241, 223, 208, 208—1

[56] References Cited
UNITED STATES PATENTS

| | | | |
|---|---|---|---|
| 2,992,664 | 7/1961 | De Shano ..................... | 144/235 |
| 3,198,224 | 8/1965 | Hiley ............................ | 144/2—11 |
| 3,342,532 | 9/1967 | Krekeler ...................... | 299/92 |

*Primary Examiner*—Gil Weidenfeld
*Attorney*—Melvin A. Crosby

ABSTRACT: The invention relates to a cutting device which has a cutting disc rotatably mounted on the outer end of a swingable arm and with the disc having a plurality of support blocks for cutter members mounted thereon in distributed relation about the periphery. Each support block has a bore which rotatably receives the shank of a picklike cutting member which is retained in assembled relation with the respective block while being free to rotate relative to the block.

Patented March 16, 1971

INVENTOR.
JAMES F. McCREERY
BY
Melvin A. Crosby

Patented March 16, 1971
3,570,566
3 Sheets-Sheet 2
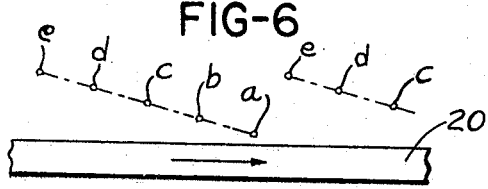
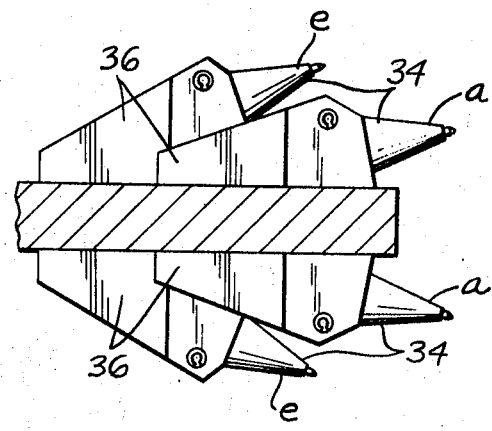
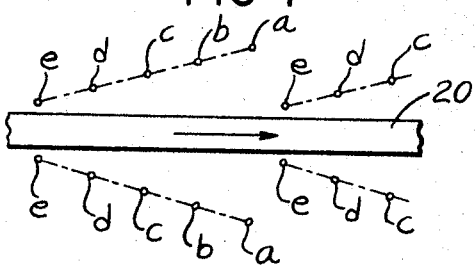
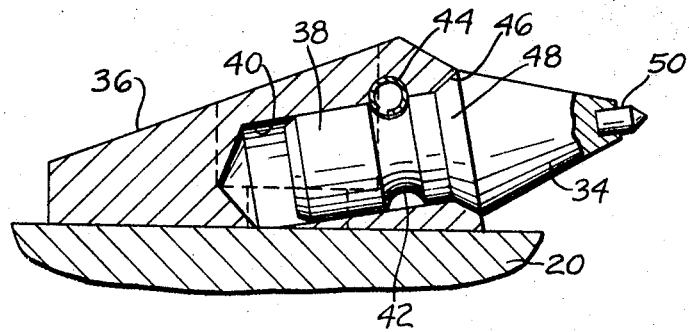
INVENTOR.
JAMES F. McCREERY
BY INVENTOR.
JAMES F. McCREERY
BY

ROTARY CUTTING DEVICE

This invention relates to mobile cutting devices having disclike cutting members and is particularly concerned with such devices wherein the disclike cutting member has pick-type tools detachably mounted thereon.

A device which is used relatively widely in the clearing of fields and the like is a piece of mobile apparatus referred to as a stump cutter or a root cutter and which is operable for cutting stumps of trees down to such a level beneath the level of the ground that the stumps present no problem with respect to surface work or construction.

Heretofore, such devices have used a driven disc having mounted thereon cutting elements in the form of rectangular metal bars with cemented tungsten carbide tips on the working side. By rotating the disc and presenting the edge of the disc to the stumps to be cut, and moving the disc laterally relative to the stump, the stumps can be cut off down to, say, 24 inches below the surface of the ground. Such stump cutters operate with a fair degree of efficiency but the cutting tools wear rapidly and bend easily and, in particular, can be badly bent upon striking a rock.

The same type of machine is employed for cutting roots and edging along sidewalks and curbing and streets by employing a somewhat larger disc with the same type of cutting tools distributed along the periphery of the disc so that the disc can be pushed down into the earth and cut off roots and other objectionable material that might damage sidewalks, curbing, or paving.

In still other cases, usually employing a still larger disc, the machine can be employed for breaking frost to permit ground working operations, such as laying cable in the ground. In this last mentioned case also the cutting tools are confined to the periphery of the disc.

All of the machines referred to above have conventionally employed the rectangular bar-type tools with carbide tipping thereon with the barlike tools often being bent out laterally from the disc on which they are mounted to increase the width of cut taken by the disc. Also, as mentioned, the tools tend to break and bend and, in particular, those tools that are bent outwardly from the supporting disc are easily bendable upon striking an obstruction in the earth, such as a rock.

With the foregoing in mind, a primary objective of the present invention is the provision of an apparatus of the nature referred to embodying a novel-type cutting tool in which bending and breaking of the cutting tools is substantially eliminated.

Another object of this invention is the provision of a novel-type cutting tool and a supporting arrangement therefor for apparatus of the nature referred to in which the speed of operation of the apparatus is as rapid, or more rapid, than is possible with conventional cutting tools.

Still another object of this invention is the provision of a cutting tool in a supporting arrangement therefor for apparatus of the nature referred to in which the tools can readily be replaced when necessary.

Still a further object of this invention is the provision of a cutting tool and a supporting arrangement therefor for apparatus of the nature referred to in which the cutting tools rotate in their supports when in use and thereby remain sharp throughout the life thereof.

These and other objects and advantages of the present invention will become more apparent upon reference to the following detailed specification taken in connection with the accompanying drawings in which:

FIG. 3 is a sectional view indicated by line III—III on FIG. 2 and showing the distribution of cutting elements at the periphery of the wheel;

FIG. 4 is a section indicated by line IV—IV on FIG. 2 showing more in detail the construction of a typical cutting element and the holder therefor;

FIGS. 6 and 7 are diagrammatic developed views showing the axial distribution of the cutting elements in the cutting wheel;

Figure 1:
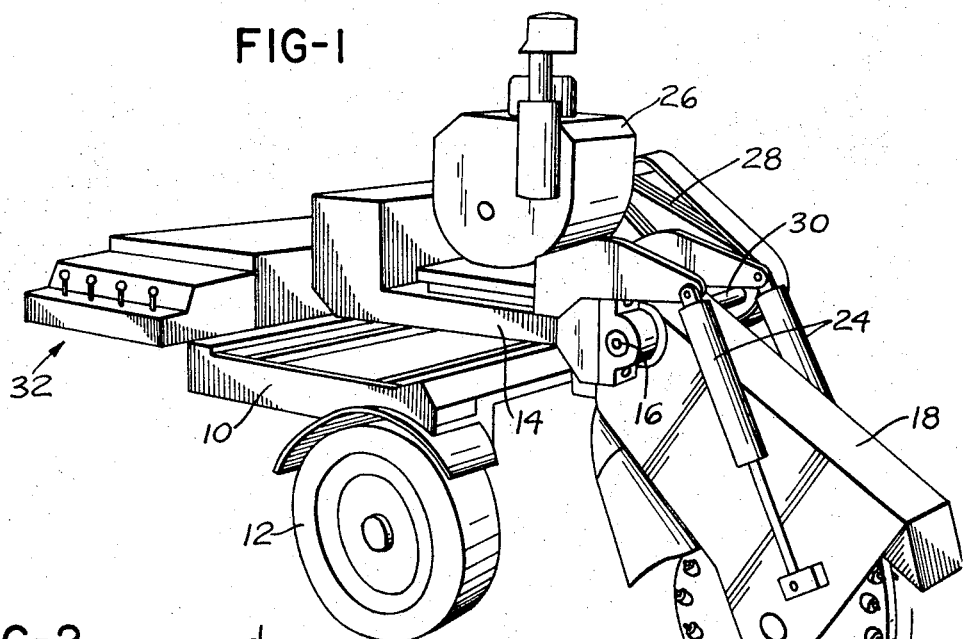
FIG. 1 is a somewhat schematic view showing a stump cutter having a cutting wheel constructed according to the present invention.

Referring to the drawings somewhat more in detail, FIG. 1 shows, somewhat schematically, a stump cutting apparatus according to the present invention. This apparatus is typical of the root cutter and frost cutter devices referred to except the stump cutter provides for lateral movement of the cutting disc, in addition to rotary and up and down movement thereof whereas with roots cutters and frost cutter do not move the cutting disc laterally. In FIG. 1 the machine comprises a frame 10 having ground wheels 12 so that it can be moved about. Laterally reciprocable on frame 10 is a carriage 14. Any suitable means such as a reversible chain can be employed to connect carriage 14 to frame 10 for reciprocating carriage 14 back and forth on frame 10. Pivoted to frame 14 on an axis 16 is an arm structure 18 projecting outwardly from carriage 14 and rotatably supporting at its outer end a cutting disc 20 which has mounted thereon cutting tools and supports therefor, as generally indicated at 22 and constructed in accordance with the present invention.

Fluid cylinders 24 connected between arm 18 and carriage 14 are employed for raising and lowering the outer end of the arm to cause the disc 20 to advance into the work. An engine 26 mounted on carriage 14 is connected by belts 28 with a shaft 30 which is either geared or belted to the supporting shaft for disc 20 so the disc 20 can be driven in rotation.

The raising and lowering of disc 20 and the lateral movement thereof may be controlled by the operator from a control station at 32 on frame 10.

Figure 2:
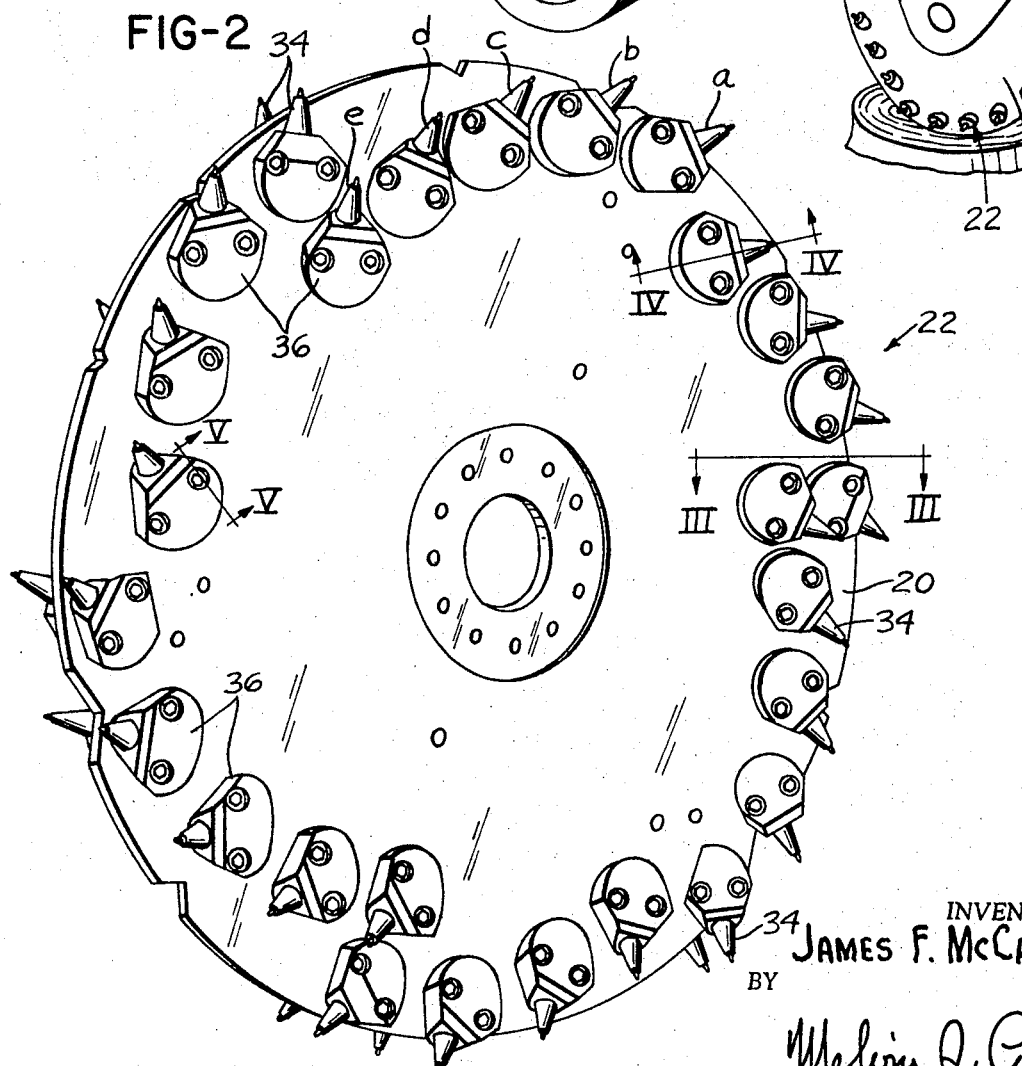
FIG. 2 is a perspective view showing the cutting wheel removed from the machine.

Turning now to FIG. 2, disc 20 and the cutting tool-holder combination 22 mounted thereon are shown somewhat more in detail. FIG. 2 also has marked thereon section lines III—III, IV—IV, and V—V and FIGS. 3, 4 and 5, indicated by the sections, further illustrate the cutting tools and the holders therefor.

FIGS. 6 and 7 are schematic views looking in at disc 20 edgewise and showing the location of the pointed tip ends of the tools as they may be arranged relative to the plane of the cutting disc.

In FIG. 2 it will be seen that the cutting tools, designated 34 and their holders 36, are arranged in groups of four and five about the periphery of disc 20 and on both sides thereof and that the support blocks 36 are so distributed on each side of the disc that the respective cutting tools of each group are arranged in a spiral path.

Thus, in FIG. 2, the cutting tool at *a* is disposed at the radially outermost portion of its group while the cutting tools marked at *b, c, d,* and *e* are progressively closer to the axis of rotation of disc 20. It will also be noted that the final cutting tool *e* of each group is relatively close in the circumferential direction to the leading cutting tool of the next following group.

In addition to the cutting tools of each group occupying different radial positions, they also occupy respectively different axial positions. This is shown in FIGS. 6 and 7 which can be considered to be views looking in edgewise at disc 20 of FIG. 2 and showing only the pointed tip ends of the cutting tools. FIG. 6 shows an arrangement similar to that illustrated in FIG. 2 and wherein the cutting tools at *a*, which are the radially outermost of the respective group, are also the closest to the plane of disc 20. The other cutting tools *b, c, d,* and *e* of each group are progressively farther away from the plane of disc 20. The result of the arrangement is that the cutting tools sweep a substantial volume so that cutting is extremely rapid and relatively large stumps can be cut out quickly.

In FIG. 7 a modified arrangement is shown wherein the radially outermost cutting tools *a* are the most remote axially from the plane of disc 20 while the other cutting tools *b, c, d,* and *e* of each group are progressively nearer to the plane of disc 20.

The arrangement of FIG. 6 is generally preferred because the cutting tools which follow the cutting tools *a* are working toward an opened center region. Either of the FIG. 6 or 7 arrangements however will produce satisfactory results with rapid cutting of the stump.

FIG. 3 shows another view of the relationship between the leading cutting tool *a* of one group thereof and the final cutting tool *e* of the preceding group thereof.

FIG. 4 shows how each cutting tool is in the form of a rodlike member symmetrical about a longitudinal axis and having a cylindrical shank portion 38 received in a bore 40 in the pertaining support block 36. Shank portion 38 has an annular groove 42 therein and a roll pin, or the like, at 44 is driven into the block to hold the cutting tool therein. As will be seen, there is a small clearance between the surface of groove 42 and the outer surface of pin 44 so that the cutting tool is rotatable in bore 40. Advantageously, bore 40 has a tapered mouth 46 which is engaged by a tapered seat 48 on the cutting tool to sustain the thrust on the cutting tool while still permitting the tool to rotate in bore 40. The other end of the cutting tool tapers inwardly toward a point and mounted in the point end of the tool is a pointed rod 50 of a hard wear-resistant material, preferably cemented tungsten carbide.

In operation, the tool, due to the manner in which it is mounted on the disc, is driven substantially endwise against the stump to be cut and the maximum strength of the cutting tool and its support is therefore realized and there is no tendency for the cutting tools to bend. Even if the cutting tools strike a rock, the tools are sufficiently substantial, in view of the manner in which they are supported, that they do not bend or break. Further the tools tend to rotate when in use and this will distribute the wear peripherally about the tools and the working tip ends thereof will stay sharp at all times and in the best cutting condition. The action of the tools on the wood of stumps for somewhat of a splitting or shredding action, as opposed to the cutting action which occurs when conventional tools are used so that the work load on the disc is reduced and the cutting up of stumps is more rapid than with conventional tools.

Figure 5:
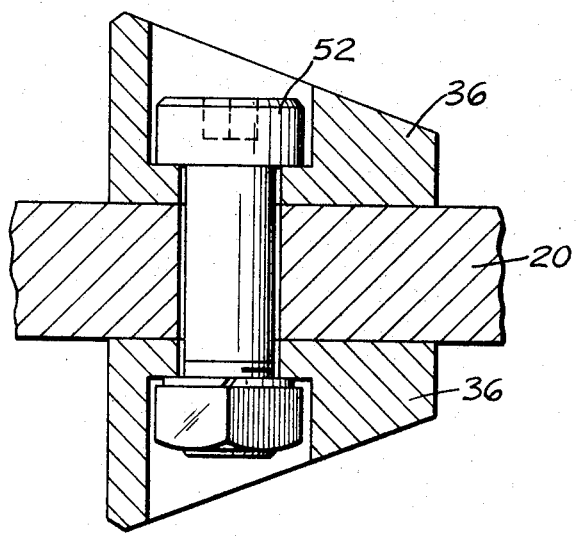
FIG. 5 is a sectional view indicated by line V—V on FIG. 2 and showing how the support blocks for the cutting elements are secured to the disclike cutting wheel.

For the stump cutter arrangement described, it is advantageous to mount blocks on opposite sides of the disc in alignment with each other as shown in FIG. 5 and then to use the same bolts 52 to clamp the opposite blocks together and fix them to the disc. This arrangement also has the tendency to reduce bending movements at the edge of the disc.

Figure 8:
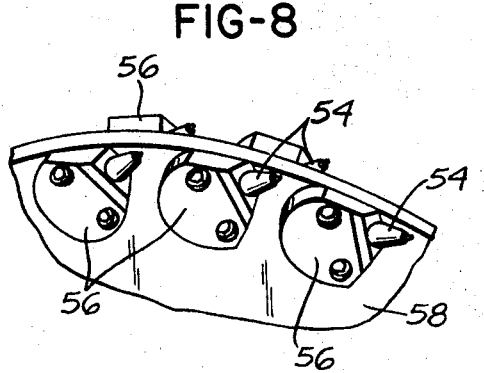
FIG. 8 is a fragmentary perspective view showing a portion of a cutter disc especially adapted for edging operations or for root cutting.

In the stump cutter, the cutting tools are distributed circumferentially and radially about the disc near the periphery thereof but for frost cutting and edging or root cutting the same cutting tools are distributed in a somewhat different manner. FIG. 8 shows how cutting tools 54 mounted in holders 56 can be distributed about the periphery of a disc 58 with all of the cutting tools being near the periphery of the disc instead of being distributed radially thereof. The cutting tools in FIG. 8 may all be at the same axial distance from the plane of disc 58 or they may be somewhat staggered in the axial direction if so desired.

Figure 9:
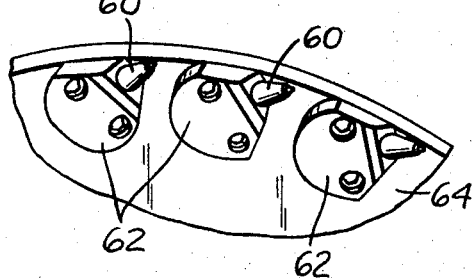
FIG. 9 is a fragmentary perspective view showing a portion of a disc especially adapted for cutting ice and frozen earth.

In FIG. 9 the cutting tools 60 and their support blocks 62 are arranged on one side only of the supporting disc 64 and near the periphery thereof. Cutting tools 60, similar to cutting tools 54 of FIG. 8, may be at the same radial and axial distance from the center point of the supporting disc, or they may be somewhat staggered in both directions.

All of the arrangements shown are characterized in that the cutting tools rotate in use and thus remain sharp throughout their life and are so supported as to develop the maximum strength of the material thereof so that breakage is at a minimum. Cutting is rapid and, when necessary, the tools can readily be exchanged for new ones. The tools are relatively inexpensive and are easily fabricated and the use of cutting tools according to the present invention in apparatus of the nature disclosed represents a substantial economy over the use of the conventional barlike tools referred to.

I claim:

1. In a cutting machine; a frame, a support arm moveably carried by said frame, a disc rotatably mounted on said arm, means on the frame drivingly connected to said disc to drive the disc in rotation in one direction, and pick-type cutter members mounted on said disc in circumferentially distributed relation, each cutter member having a cylindrical support shank at one end supportingly engaged by said disc and tapering inwardly to a point at the other end, and each cutter member having its point end directed in a direction generally radially outwardly of said disc and inclined forwardly in the direction of rotation of said disc.

2. A cutting machine according to claim 1 which includes a support block fixed to said disc for each cutter member, each support block having a bore therein, each cutter member having its shank rotatably mounted in a respective said bore, and retaining means retaining each cutter member in assembled relation with the respective support block, and said support blocks being distributed about the periphery of said disc.

3. A cutting machine according to claim 2 which said support block and cutter members are mounted on both sides of said disc.

4. A cutting machine according to claim 3 in which said support block and cutter members on each side of said disc are arranged in circumferential groups with the point ends of said cutter members of each group distributed radially and axially with reference to said disc.

5. A cutting machine according to claim 4 in which the point end of the cutter member at the leading end of each group projects radially beyond the periphery of said disc while the point ends of the others of the cutter members of the respective group are disposed successively closer to the axis of rotation of said disc.

6. A cutting machine according to claim 5 in which the point ends of the cutter members of each group are disposed in a path inclined to the plane of said disc.

7. A cutting machine according to claim 3 in which said support blocks are so mounted on said disc that a support block on one side of the disc is axially aligned with a support block on the other side of the disc to form a pair, and bolts extending through each said pair of blocks and disc to secure the pairs of blocks to the disc.

8. A cutting machine according to claim 2 in which the bore in each support block has a tapered seat at the end and each cutter member has a tapered seat engaging portion at the end of the shank for engagement with said seat.

9. A cutting machine according to claim 8 in which said retaining means comprises a pin in each support block intersecting the bore in the block near the periphery thereof, and each shank having a groove for loosely receiving a said pin whereby each cutter member is retained in its block but is rotatable therein.